(12) United States Patent
Amano et al.

(10) Patent No.: US 8,573,623 B2
(45) Date of Patent: Nov. 5, 2013

(54) FRONT FORK

(75) Inventors: Yuuki Amano, Kakamigahara (JP); Takahisa Mochizuki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/818,898

(22) PCT Filed: Sep. 20, 2011

(86) PCT No.: PCT/JP2011/071380
§ 371 (c)(1),
(2), (4) Date: Feb. 25, 2013

(87) PCT Pub. No.: WO2012/039396
PCT Pub. Date: Mar. 29, 2012

(65) Prior Publication Data
US 2013/0154233 A1    Jun. 20, 2013

(30) Foreign Application Priority Data
Sep. 21, 2010   (JP) .................................. 2010-210414

(51) Int. Cl.
*B62K 21/08* (2006.01)
(52) U.S. Cl.
USPC ........ 280/276; 280/279; 180/227; 188/267.1; 188/267.2
(58) Field of Classification Search
USPC ................ 280/276, 279; 180/227; 188/267.1, 188/267.2
See application file for complete search history.

(56) References Cited

U.S. PATENT DOCUMENTS

| | | | |
|---|---|---|---|
| 2009/0294231 A1* | 12/2009 | Carlson et al. | 188/267.2 |
| 2010/0294605 A1 | 11/2010 | Mochizuki | |
| 2012/0160621 A1* | 6/2012 | Battlogg et al. | 188/267.2 |

FOREIGN PATENT DOCUMENTS

| | | |
|---|---|---|
| JP | 2007-170598 A | 7/2007 |
| JP | 2010-007758 A | 1/2010 |
| JP | 2010-084923 A | 4/2010 |
| JP | 2010-084925 A | 4/2010 |

* cited by examiner

*Primary Examiner* — Anne Marie Boehler
*Assistant Examiner* — Marlon Arce
(74) *Attorney, Agent, or Firm* — Rabin & Berdo, P.C.

(57) ABSTRACT

A front fork includes a damper that generates a damping force, a cylinder body that houses the damper, a reservoir formed on an exterior of the cylinder body, a rod body that is inserted into the cylinder body to be capable of advancing and retreating, a piston portion that defines an upper chamber and a lower chamber within the cylinder body, a through hole allows a working fluid to flow from the cylinder body into the reservoir, a flow rate control mechanism that is disposed in the vehicle body side tube to face an upper end opening of the through hole, and applies a resistance to a flow of the working fluid flowing toward the reservoir from the rod body, and a driving mechanism that drives the flow rate control mechanism to adjust an expansion side damping force and a contraction side damping force generated by the damper.

7 Claims, 5 Drawing Sheets

FRONT FORK

FIELD OF THE INVENTION

This invention relates to a front fork, which is a hydraulic shock absorber that suspends a front wheel of a motorcycle.

BACKGROUND OF THE INVENTION

JP2010-7758A proposes a configuration for controlling adjustment of an expansion side damping force generated by a damper provided in a front fork on an upper end portion side of a vehicle body side tube. Further, JP2007-170598A proposes a configuration for controlling adjustment of a contraction side damping force generated by a damper provided in a front fork on a bottom portion side of a vehicle wheel side tube.

In the front fork disclosed in JP2010-7758A, adjustment of the expansion side damping force is controlled by an actuator serving as a driving mechanism. In the front fork disclosed in JP2007-170598A, adjustment of the contraction side damping force is executed by a manual operation.

According to the front forks disclosed in JP2010-7758A and JP2007-170598A, the riding comfort of a motorcycle can be set in a favorable condition by appropriately adjusting the damping force on both the expansion side and the contraction side.

SUMMARY OF THE INVENTION

In the front forks disclosed in JP2010-7758A and JP2007-170598A, however, if the contraction side damping force generated by the inbuilt damper is to be generated automatically using an actuator, the actuator is disposed on the bottom portion side of the vehicle wheel side tube.

In other words, if the contraction side damping force is adjusted in one of a left-right pair of front forks while adjusting the expansion side damping force using an actuator disposed in the upper end portion of the vehicle body side tube in the other front fork, actuators are provided in both the left and right front forks.

Further, if the expansion side damping force is adjusted using an actuator disposed in the upper end portion of the vehicle body side tube and the contraction side damping force is adjusted using an actuator disposed on the bottom portion side of the vehicle wheel side tube in a left-right pair of front forks, one of the front forks includes both upper and lower actuators.

Hence, two actuators are required to adjust the contraction side and expansion side damping force of the front forks, making it difficult to reduce the weight and cost of the front forks.

An object of this invention is to enable reductions in the cost and weight of a front fork by making it possible to adjust expansion side and contraction side damping force generated by an inbuilt damper through control of a single driving mechanism.

To achieve the above object, this invention provides a front fork including a fork main body constituted by a vehicle body side tube and a vehicle wheel side tube, including a damper that is built into the fork main body and generates a damping force when the fork main body expands and contracts, a cylinder body that stands upright in the vehicle wheel side tube and houses the damper, a reservoir formed on an exterior of the cylinder body to store a working fluid used by the damper, a rod body that stands upright in the vehicle body side tube and is inserted into the cylinder body to be capable of advancing and retreating, a piston portion that is held on a tip end portion of the rod body and housed slidably in the cylinder body so as to define an upper chamber and a lower chamber within the cylinder body; a through hole formed in an interior of the rod body to allow the working fluid to flow from the cylinder body into the reservoir through the through hole when the rod body expands and contracts relative to the cylinder body, a flow rate control mechanism that is disposed in an upper end portion of the vehicle body side tube to face an upper end opening of the through hole, and applies a resistance to a flow of the working fluid flowing toward the reservoir from the upper end opening in the rod body, and a driving mechanism that drives the flow rate control mechanism to adjust an expansion side damping force and a contraction side damping force generated by the damper.

The details as well as other features and advantages of this invention are set forth in the remainder of the specification and are shown in the accompanying drawings.

DESCRIPTION OF THE PREFERRED EMBODIMENTS

A front fork 100 according to an embodiment of this invention will be described below with reference to the figures.

First, referring to FIGS. 1 to 5, a configuration of the front fork 100 will be described.

The front fork 100 is a hydraulic shock absorber that suspends a front wheel of a motorcycle. The front fork 100 is provided in a left-right pair constituted by a front fork 101 shown in FIG. 1 and another front fork 102 shown in FIG. 2.

Figure 1:
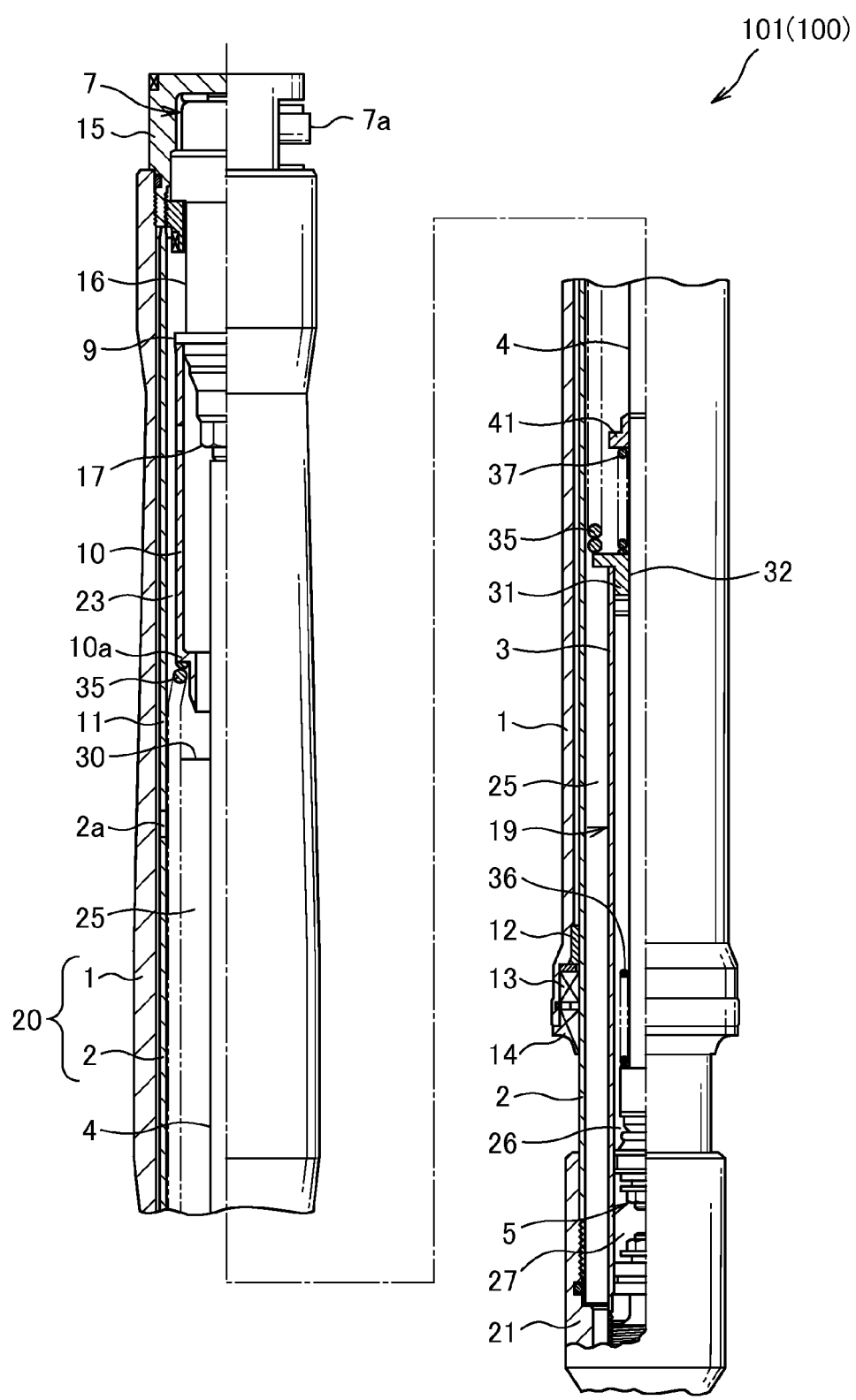
FIG. 1 is a front half-sectional view showing one of a left-right pair of front forks according to an embodiment of this invention.
Figure 2:
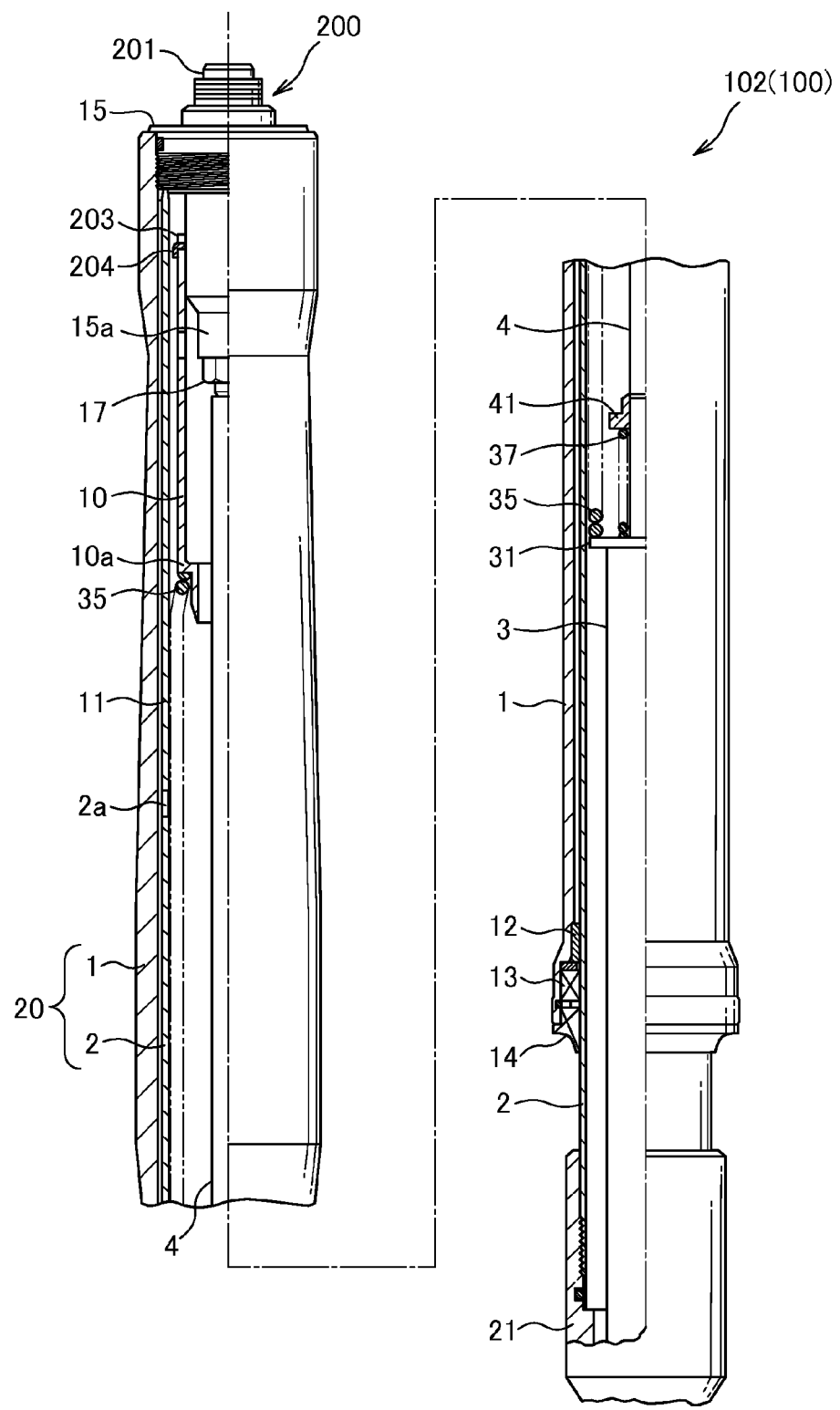
FIG. 2 is a front half-sectional view showing the other of the left-right pair of front forks according to this embodiment of the invention.

As shown in FIG. 1, the front fork 101 has an internal suspension spring 35 and is capable of adjusting a damping force generated by an inbuilt damper 19. The front fork 102, on the other hand, as shown in FIG. 2, does not include the inbuilt damper 19 and therefore applies only a spring force generated by the internal suspension spring 35.

The front fork 101 can be maintained in an expanded condition by the suspension spring 35. Accordingly, the damper 19 built into the front fork 101 is also maintained in an expanded condition.

It should be noted that the front fork 101 and the front fork 102 may have identical configurations including both the damper 19 and the suspension spring 35. Likewise in this case, the front fork 100 is often provided in a left-right pair.

When the front fork 101 and the front fork 102 are to be mounted on a front wheel side of a motorcycle, respective upper end side portions thereof are integrated in advance by a bridge mechanism, not shown in the figures. Lower end portions of respective vehicle wheel side tubes 2 of the front forks 101, 102 are then coupled to an axle of the front wheel. As a result, the front fork 101 and the front fork 102 suspend the front wheel from either side thereof.

The bridge mechanism includes an upper bracket coupled to upper side portions of upper end portions of respective vehicle body side tubes 1 of the front forks 101, 102, and an under bracket coupled to lower side portions thereof. Attachment holes are formed in respective end portions of both the upper bracket and the under bracket. The upper end portions of the respective vehicle body side tubes 1 of the front forks 101, 102 are inserted into the attachment holes so as to be gripped integrally by the upper bracket and the under bracket.

The bridge mechanism also includes a single steering shaft disposed in the center of the respective vehicle body side tubes 1 of the front forks 101, 102 so as to couple the upper bracket and the under bracket integrally. The steering shaft is inserted rotatably into a head pipe forming a tip end portion of a vehicle body of the motorcycle. As a result, a handle operation performed by a rider is transmitted to the front wheel via the front forks 101, 102, whereby the front wheel can be steered in a left-right direction.

The front fork 101 and the front fork 102 respectively include the vehicle body side tube 1 serving as an upper end side member and the vehicle wheel side tube 2 serving as a lower end side member. The vehicle wheel side tube 2 is inserted into the vehicle body side tube 1 to be capable of advancing and retreating telescopically. The vehicle body side tube 1 and the vehicle wheel side tube 2 constitute a fork main body 20 that is capable of expansion and contraction.

In the front fork 101 shown in FIG. 1, a predetermined damping force can be generated by causing the damper 19 built into the fork main body 20 to expand and contract. In the other front fork 102 shown in FIG. 2, a predetermined spring force can be generated by causing the internal suspension spring 35 of the fork main body 20 to expand and contract.

The suspension spring 35 is a coil spring disposed between the vehicle body side tube 1 and the vehicle wheel side tube 2. The suspension spring 35 biases the fork main body 20 in an expansion direction.

The fork main body 20 includes a bearing 11 and a bearing 12 disposed at a vertical remove from each other between the vehicle body side tube 1 and the vehicle wheel side tube 2. In the fork main body 20, a sliding property is secured between the vehicle body side tube 1 and the vehicle wheel side tube 2 by the bearing 11 and the bearing 12.

A lubrication gap is formed in the fork main body 20 between the vehicle body side tube 1 and the vehicle wheel side tube 2 by the bearing 11 and the bearing 12 disposed at a vertical remove from each other. Working oil serving as a working fluid flows into the lubrication gap from the interior of the vehicle wheel side tube 2 through a connecting hole 2a opening onto the vehicle wheel side tube 2. The vehicle body side tube 1 and the vehicle wheel side tube 2 are lubricated when sliding relative to each other by the working oil that flows into the lubrication gap.

As shown in FIGS. 1 and 2, the lower bearing 12 is disposed on an inner periphery of an open end portion serving as a lower end portion of the vehicle body side tube 1, and an oil seal 13 and a dust seal 14 are disposed in series with the bearing 12. In the fork main body 20 forming the front fork 101 shown in FIG. 1, the interior of the fork main body 20 is formed into an airtight space by providing the oil seal 13.

The dust seal 14 scrapes away dust such as minute sand particles adhered to an outer periphery of the vehicle wheel side tube 2, thereby preventing the dust from infiltrating the oil seal 13. The dust seal 14 thus safeguards the sealing function of the oil seal 13.

When the vehicle wheel side tube 2 advances into the vehicle body side tube 1 such that the fork main body 20 is fully contracted, as shown in FIGS. 1 and 2, an upper end of the vehicle wheel side tube 2 contacts the vehicle body side tube 1, thereby preventing further contraction.

When the vehicle wheel side tube 2 withdraws from the vehicle body side tube 1 such that the fork main body 20 is fully expanded, on the other hand, an extended spring 36 housed in the damper 19 contracts fully, and impact absorption is realized by the full contraction of the extended spring 36.

The damper 19 does not have to be provided in the fork main body 20 of the front fork 102. Rather than forming two fork main bodies 20, one provided with the damper 19 and one without, at this time, the fork main body 20 of the front fork 102 may be constructed to differ from the damper 19 simply in not including a damping mechanism. More specifically, in the front fork 102, a piston portion 5 housed in a cylinder body 3 may be formed such that working oil can pass through freely.

In a case where the fork main body 20 of the front fork 102 includes an expanding/contracting body not having a damping mechanism, the number of bearing portions is increased. Therefore, in comparison with a case where the fork main body 20 does not include an expanding/contracting body, a bending strength of the fork main body 20 can be improved.

Hence, an expanding/contracting body not having a damping mechanism is likewise housed in the fork main body 20 of the front fork 102. In so doing, impact absorption can be realized by the extended spring 36 when the expanding/contracting body is fully extended.

As shown in FIGS. 1 and 2, the respective fork main bodies 20 described above are inverted bodies in which the vehicle body side tube 1 is a large diameter outer tube and the vehicle wheel side tube 2 is a small diameter inner tube. However, the fork main bodies 20 are not limited to this configuration and may be upright bodies in which the vehicle body side tube 1 serves as the small diameter inner tube and the vehicle wheel side tube 2 serves as the large diameter outer tube.

Incidentally, in the fork main body 20 of the front fork 101 shown in FIG. 1, the interior airtight space formed by the oil seal 13 serves as a reservoir 25. The reservoir 25 houses a predetermined amount of working oil, and includes an air chamber 23 defined by an oil level 30 of the working oil. The air chamber 23 expands and contracts in synchronization with the expansion and contraction of the fork main body 20. While expanding and contracting, the air chamber 23 generates a reaction force constituted by an air spring force of a predetermined magnitude.

Air is sealed into the air chamber 23 under a desired pressure. A gas chamber in which an inert gas is sealed under a desired pressure may be used instead of the air chamber 23. Further, an air valve, not shown in the figures, may be provided in a cap member 15 that closes an upper end opening of the vehicle body side tube 1 to enable adjustment of an internal pressure of the air chamber 23.

It should be noted that since the damper 19 is not built into the front fork 102 shown in FIG. 2, working oil does not have to be housed in the fork main body 20. In this case, a larger air chamber than that of the front fork 101 is formed in the fork main body 20. The reaction force generated by expansion and contraction of this air chamber is much smaller than the reaction force generated during expansion and contraction of the fork main body 20 in the front fork 101. Hence, in a case where no working oil is housed in the front fork 102, the reaction force generated by expansion and contraction of the air chamber need not be taken into account.

In the fork main body 20 of the front fork 101, on the other hand, the damper 19 is provided inside the reservoir 25 housing the working oil. The damper 19 includes the cylinder body 3, which stands upright in an axial center portion of the vehicle wheel side tube 2 serving as the lower end side member, and a rod body 4 that is suspended in an axial center portion of the vehicle body side tube 1 serving as the upper end side member such that a tip end side serving as a lower end side thereof penetrates the cylinder body 3 to be capable of advancing and retreating. The damper 19 is formed to be upright.

In the damper 19, the piston portion 5 is housed slidably in the cylinder body 3, which is filled with working oil. A tip end portion of the rod body 4 is coupled to the piston portion 5.

As shown in FIGS. 1 and 2, a bottom end portion of the cylinder body 3 is coupled by screwing to a bottom member 21 that closes a lower end opening of the vehicle wheel side tube 2.

Figure 3:
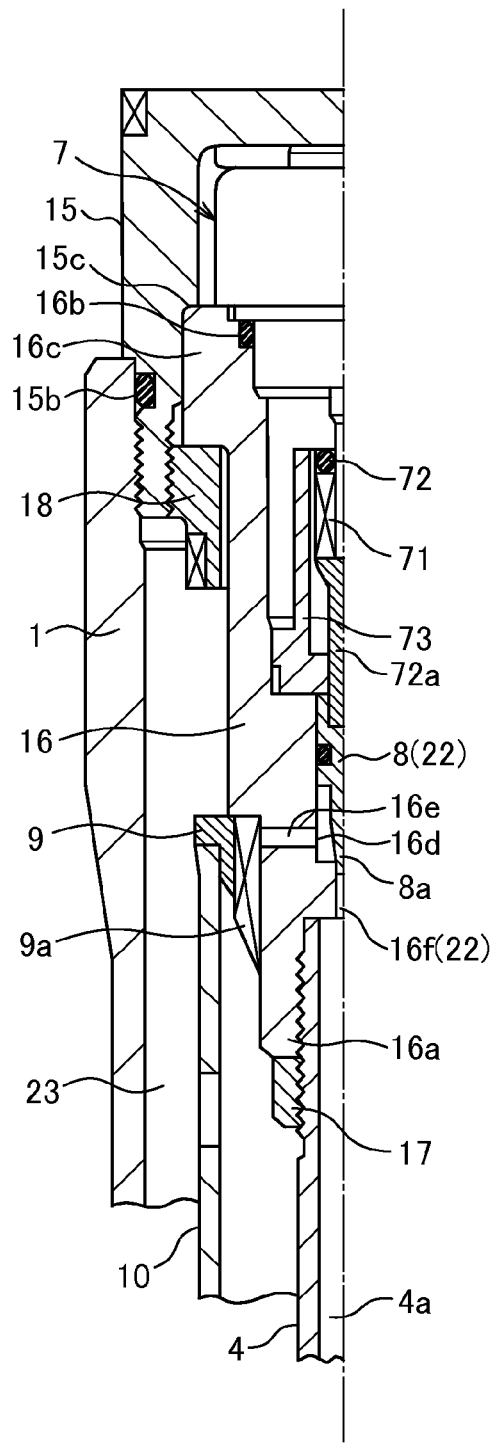
FIG. 3 is an enlarged sectional view showing an upper end portion of FIG. 1.

As shown in FIG. 3, in the front fork 101, a base end portion of the rod body 4 is coupled by screwing to a lower end coupling portion 16a of a holder member 16 that is coupled to the cap member 15 closing the upper end opening of the vehicle body side tube 1. Further, the rod body 4 is fixed to the holder member 16 by screwing a lock nut 17 to the lower end coupling portion 16a.

Figure 5:
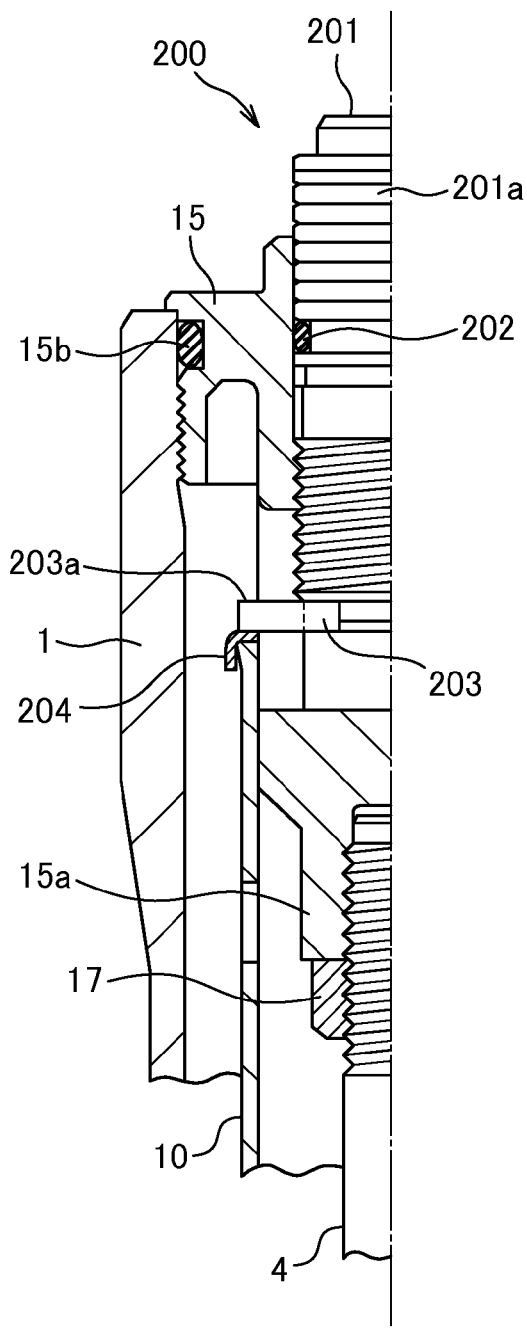
FIG. 5 is an enlarged sectional view showing an upper end portion of FIG. 2.

As shown in FIG. 5, in the front fork 102, the base end portion of the rod body 4 is coupled by screwing to a lower end coupling portion 15a of the cap member 15 that closes the upper end opening of the vehicle body side tube 1. Further, the rod body 4 is fixed to the cap member 15 by screwing the lock nut 17 to the lower end coupling portion 15a.

It should be noted that this invention is not limited to the structure described above, and the cylinder body 3 may stand upright in the axial center portion of the vehicle wheel side tube 2 using any desired structure. Further, the rod body 4 may be suspended in the axial center portion of the vehicle body side tube 1 using any desired structure.

As shown in FIG. 1, an upper end opening of the cylinder body 3 is closed by a rod guide 31 that supports a lower end of the suspension spring 35. The rod body 4 penetrates an axial center portion of the rod guide 31 via a bush 32.

When the damper 19 is fully contracted, the rod guide 31 holds a balance spring 37 which is held fixedly on an outer periphery of the rod body 4 in a contracted condition.

The balance spring 37 biases the damper 19 in the expansion direction using a reaction force generated when the damper 19 is fully contracted. Hence, the reaction force generated when the damper 19 is fully contracted is suppressed, and as a result, the damper 19 is prevented from starting to expand suddenly when it shifts to an expansion operation from a fully contracted condition.

It should be noted that an upper end of the suspension spring 35 is latched to a lower end step portion 10a of a spring holder 10 formed in a tubular shape.

In the front fork 101, an upper chamber 26 serving as a rod side chamber located above the piston portion 5 and a lower chamber 27 serving as a piston side chamber located below the piston portion 5 are defined by the piston portion 5 within the cylinder body 3 in the interior of the damper 19.

Figure 4:
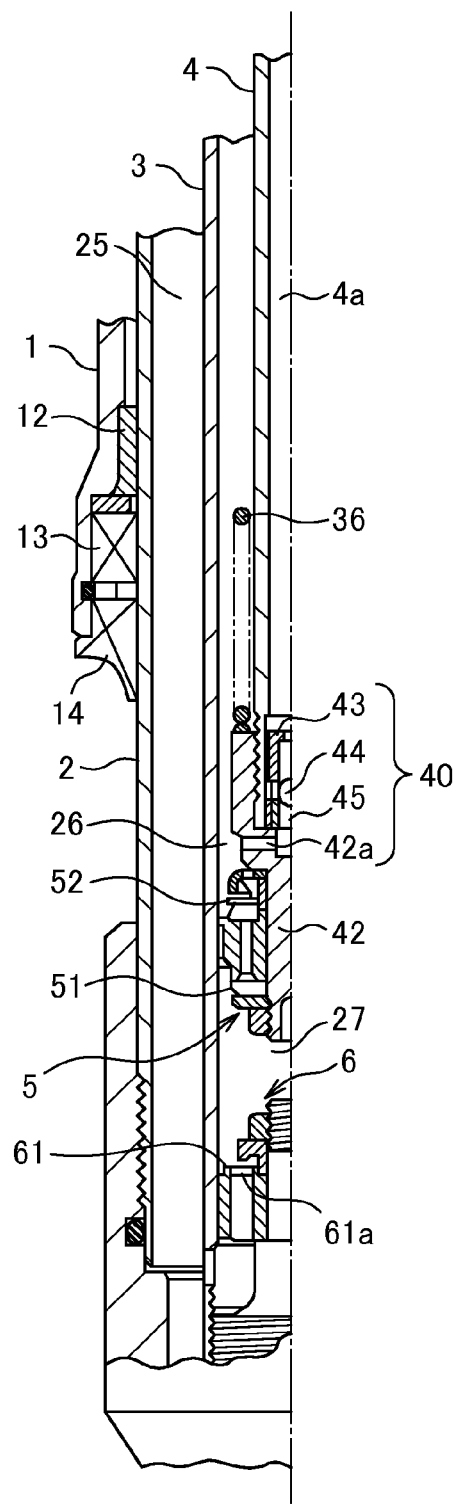
FIG. 4 is an enlarged sectional view showing a lower end portion of FIG. 1.

As shown in FIG. 4, the piston portion 5 includes an expansion side damping valve 51 serving as an expansion side damping mechanism. Therefore, when the upper chamber 26 communicates with the lower chamber 27 via the expansion side damping valve 51 in the damper 19, a predetermined expansion side damping force is generated.

As will be described below, in this invention, the damper 19 in the front fork 101 may be provided without the expansion side damping valve 51 in the piston portion 5 housed in the cylinder body 3. In this case, the piston portion 5 includes only an expansion side check valve 52.

In the damper 19 of the front fork 101, a base valve portion 6 is provided in a bottom end portion of the cylinder body 3. The base valve portion 6 includes a contraction side check valve 61 that enables communication between the exterior of the cylinder body 3, or in other words the reservoir 25 inside the fork main body 20, and the lower chamber 27 in the cylinder body 3.

In this embodiment, as shown in FIG. 4, the contraction side check valve 61 includes a throttle flow passage 61a serving as a contraction side damping mechanism that allows working oil in the lower chamber 27 to flow out into the reservoir 25. The throttle flow passage 61a is formed in the shape of an orifice, and realizes a contraction side damping action.

It should be noted that the contraction side check valve 61 in the base valve portion 6 may be provided without the throttle flow passage 61a so as to function only as a contraction side check valve.

In the damper 19 of the front fork 101, as shown in FIGS. 3 and 4, the rod body 4 is constituted by a pipe body. A through hole 4a serving as a working oil flow passage is provided in an axial center portion of the rod body 4. As shown in FIG. 3, an upper end opening of the through hole 4a opens onto a base end, i.e. an upper end, of the rod body 4. By forming the rod body 4 from a pipe body in this fashion, a reduction in the weight of the damper 19 can be achieved.

Further, using the through hole 4a as a working oil flow passage, a resistance generated as the working oil flows through the flow passage can be controlled. More specifically, the resistance of the working oil that spews out of the upper end opening in the rod body 4 and flows toward the reservoir 25 can be controlled. By forming the rod body 4 from a pipe body in this fashion, therefore, the configuration for generating the damping force can be simplified.

Since the weight of the damper 19 can be reduced by forming the rod body 4 from a pipe body, the rod body 4 in the expanding/contracting body not having a damping mechanism, which is housed in the front fork 102 shown in FIG. 2, is preferably also formed from a pipe body.

As shown in FIG. 3, the base end portion of the rod body 4 is coupled to the lower end coupling portion 16a of the holder member 16 coupled to the cap member 15 that closes the upper end opening of the vehicle body side tube 1. The holder member 16 includes a needle valve body 8 of a flow rate control mechanism 22 to be described below, and an actuator 7 serving as a driving mechanism that drives the needle valve body 8.

The cap member 15 is formed in a closed-end cylindrical shape such that when the cap member 15 is screwed to the upper end portion of the vehicle body side tube 1, a hollow portion is defined in the interior thereof. The holder member 16 is formed in a closed-end cylindrical shape and coupled to the cap member 15 so as to close a lower end side opening in the cap member 15 from below. The hollow portion of the cap member 15 and a hollow portion formed inside the holder member 16 and connected to the hollow portion of the cap member 15 together form a space for housing the actuator 7. The needle valve body 8 is provided in a lower end side axial center portion of the holder member 16.

The actuator 7 is an electric motor. As shown in FIG. 3, a shaft 71 formed with two parallel planes in an axial direction projects from the actuator 7. The shaft 71 is irregularly fitted into an adjuster 72. The adjuster 72 includes an output shaft portion 72a screwed to an adjuster case 73 that is press-fitted fixedly into the holder member 16. The adjuster 72 advances and retreats in the axial direction by rotating while screwed to the adjuster case 73. The needle valve body 8 is screwed to a tip end of the output shaft portion 72a of the adjuster 72. Hence, the needle valve body 8 can be caused to advance and retreat by driving the actuator 7.

A seal 15b is provided on a lower end portion outer periphery of the cap member 15. As a result, water-tightness is secured between the cap member 15 and the upper end portion of the vehicle body side tube 1. Further, a seal 16b is provided on an upper end portion inner periphery of the holder member 16. As a result, water-tightness is secured between the holder member 16 and the actuator 7.

As shown in FIG. 3, a flange portion 16c formed in a tubular shape is provided in an upper end portion of the holder member 16. The flange portion 16c is sandwiched between a step portion 15c formed in a lower end portion inner periphery of the cap member 15 and an upper end of a ring nut 18 screwed to the lower end portion inner periphery of the cap member 15. As a result, the holder member 16 is coupled integrally to the cap member 15.

As shown in FIG. 1, the actuator 7 includes an input portion 7a. The actuator 7 receives a supply of power from the exterior via a lead wire, not shown in the figures, connected to the input portion 7a.

As shown in FIG. 3, the flow rate control mechanism 22 includes the needle valve body 8 serving as a flow rate control valve body, and a small hole 16f opened in an axial center portion of the lower end portion of the holder member 16 and positioned so as to oppose a pointed end 8a of the needle valve body 8.

In the flow rate control mechanism 22, a surface area of an annular flow passage formed between the small hole 16f and the pointed end 8a of the needle valve body 8 expands and contracts when the actuator 7 is activated such that the needle valve body 8 advances and retreats in the axial direction. The flow rate control mechanism 22 is capable of adjusting the resistance applied to a flow of working oil passing through the annular flow passage, or in other words the working oil that spews out of the through hole 4a in the rod body 4 so as to flow into the reservoir 25.

The flow rate control mechanism 22 is capable not only of generating damping force by applying resistance to the flow of working oil, but also of adjusting a magnitude of the generated damping force. The flow rate control mechanism 22 therefore includes both a function for generating damping force and a function for adjusting the magnitude of the damping force.

As described above, in this invention, the needle valve body 8 that constitutes the flow rate control mechanism 22 in the damper 19 built into the front fork 101 and the actuator 7 that causes the needle valve body 8 to advance and retreat are disposed in the upper end portion of the vehicle body side tube 1 forming the fork main body 20. Therefore, the configuration of the flow rate control mechanism 22 can be simplified in comparison with a case where the needle valve body 8 and the actuator 7 are provided in or the vicinity of the piston portion 5 housed in the cylinder body 3, for example. Further, a durability of the actuator 7 can be improved.

A housing portion 16d that communicates with the small hole 16f and houses the needle valve body 8 movably and a lateral hole 16e that communicates with the housing portion 16d and opens onto the outer periphery of the holder member 16 are formed in a lower end side portion of the holder member 16. The lateral hole 16e communicates with a cutout passage 9a formed in a latch member 9 that is mounted on the outer periphery of the lower end side portion of the holder member 16.

The latch member 9 latches an upper end of the cylindrical spring holder 10 to the holder member 16. The upper end of the suspension spring 35 is latched to a lower end of the spring holder 10. Accordingly, working oil flowing out of the lateral hole 16e flows through the cutout passage 9a, passes through the interior of the spring holder, and drops onto the oil level 30 below. As a result, the working oil flowing out of the cutout passage 9a is prevented from scattering, thereby ensuring that air bubbles are not mixed into the working oil.

The spring holder 10 includes an annular gap between a lower end portion inner periphery thereof, to which the upper end of the suspension spring 35 is latched, and the outer periphery of the rod body 4. By passing through this annular gap, the working oil can pass through the spring holder 10 smoothly.

In the damper 19 built into the front fork 101, a predetermined damping force is generated by the flow rate control mechanism 22 when the working oil flows out into the reservoir 25 on the exterior of the rod body 4 through the through hole 4a formed in the axial center portion of the rod body 4. Therefore, the rod body 4 includes a rectification mechanism 40 in a lower end portion of the through hole 4a.

In this embodiment, the piston portion 5 is held on an outer periphery of a tip end member 42 forming a tip end portion of the rod body 4. The tip end member 42 includes a passage 42a that connects the upper chamber 26 to the through hole 4a in the rod body 4. The passage 42a communicates with a lower end portion inner side of the rod body 4, which is screwed to an upper end portion of the tip end member 42.

The rectification mechanism 40 is disposed on the inner periphery of the lower end portion of the rod body 4. The rectification mechanism 40 is a check valve structure having a steel ball 44 disposed to be capable of rising and falling in a valve housing 43 that is press-fitted into the lower end portion inner side of the rod body 4.

In the rectification mechanism 40, the steel ball 44 rises when a pressure on an upstream side of the steel ball 44, or in other words the upper chamber 26 side, is higher than a pressure on the reservoir 25 side. As a result, the working oil in the upper chamber 26 is permitted to flow into the through hole 4a in the rod body 4.

When the pressure on the downstream side of the steel ball 44, or in other words the reservoir 25 side, is higher than the pressure on the upper chamber 26 side, on the other hand, the steel ball 44 falls. As a result, working oil is prevented from flowing out of the through hole 4a in the rod body 4 into the upper chamber 26.

Hence, the rectification mechanism 40 enables the working oil in the cylinder body 3 to flow out into the reservoir 25 in a single direction through the through hole 4a in the rod body 4.

The steel ball 44 is prevented from falling out of the valve housing 43 by a stopper 45 press-fitted into a lower end portion inner side of the valve housing 43.

Next, actions of the front fork 101 will be described.

In the front fork 101, the damper 19 expands and contracts in synchronization with the expansion and contraction of the fork main body 20. During expansion and contraction of the damper 19, damping force is generated as follows.

When the damper 19 expands, the rod body 4 withdraws from the cylinder body 3 and the piston portion 5 rises through the cylinder body 3. As a result, the upper chamber 26 contracts and the lower chamber 27 expands.

Here, when the needle valve body 8 closes the upper end opening of the through hole 4a in the rod body 4 such that working oil is not permitted to pass through the through hole 4a in the rod body 4, the working oil from the contracting upper chamber 26 flows into the expanding lower chamber 27 through the expansion side damping valve 51 serving as the expansion side damping mechanism disposed in the piston portion 5. As a result, the expansion side damping force is generated by the expansion side damping valve 51.

At this time, a working oil deficiency corresponding to the volume by which the rod body 4 withdraws is generated in the lower chamber 27. Therefore, the contraction side check valve 61 in the base valve portion 6 is opened, whereby working oil is caused to flow in from the reservoir 25 and led into the lower chamber 27.

When the damper 19 contracts, on the other hand, the rod body 4 advances into the cylinder body 3 and the piston portion 5 falls through the cylinder body 3. As a result, the upper chamber 26 expands and the lower chamber 27 contracts.

At this time, a working oil surplus corresponding to the volume by which the rod body 4 advances is generated in the lower chamber 27. Therefore, the surplus working oil flows into the reservoir 25 through the throttle flow passage 61a in the contraction side check valve 61 of the base valve portion 6. At this time, the contraction side damping force is generated by the throttle flow passage 61a serving as the contraction side damping mechanism.

Meanwhile, in a case where the upper end opening of the through hole 4a in the rod body 4 is not closed by the flow rate control mechanism 22 when the damper 19 expands and contracts, or in other words in a case where the rectification mechanism 40 having a check valve structure allows the working oil to flow out of the upper chamber 26 into the reservoir 25, damping force is generated as follows.

When the damper 19 contracts, the rod body 4 advances into the cylinder body 3 such that the piston portion 5 falls through the cylinder body 3, and as a result, the upper chamber 26 expands. At this time, the working oil in the through hole 4a of the rod body 4 is prevented from flowing into the upper chamber 26 by the rectification mechanism 40 having a check valve structure. Hence, working oil from the lower chamber 27 is caused to flow into the expanding upper chamber 26 by opening the expansion side check valve 52 of the piston portion 5.

At this time, a working oil surplus corresponding to the volume by which the rod body 4 advances is generated in the lower chamber 27. Therefore, the surplus working oil flows into the reservoir 25 through the throttle flow passage 61a in the contraction side check valve 61 of the base valve portion 6. At this time, the contraction side damping force is generated by the throttle flow passage 61a serving as the contraction side damping mechanism.

However, the throttle flow passage 61a is an orifice structure, and therefore resistance to the flow of working oil increases as the working oil passes through the throttle flow passage 61a. Hence, a part of the surplus working oil from the lower chamber 27 is caused to flow into the upper chamber 26 by opening the expansion side check valve 52 of the piston portion 5, which applies a smaller resistance than the throttle flow passage 61a.

In the upper chamber 26 that receives a part of the surplus working oil from the lower chamber 27, a part of the surplus oil flowing in from the lower chamber 27 remains surplus. The surplus working oil flowing into the upper chamber 26 flows out into the reservoir 25 through the rectification mechanism 40 and the through hole 4a.

At this time, the needle valve body 8 is disposed in the upper end open end of the through hole 4a. The needle valve body 8 applies resistance to the flow of working oil flowing into the reservoir 25 through the through hole 4a.

Therefore, the contraction side damping force is generated on the basis of a flow passage area of the annular flow passage formed between the pointed end 8a of the needle valve body 8 and the upper end opening of the through hole 4a opposing the pointed end 8a.

When the damper 19 expands, on the other hand, the rod body 4 projects from the cylinder body 3 such that the piston portion 5 rises through the cylinder body 3, and as a result, the upper chamber 26 contracts. At this time, the rectification mechanism 40 having a check valve structure is opened in the through hole 4a of the rod body 4 so that the working oil in the upper chamber 26 is permitted to flow out into the reservoir 25 through the rectification mechanism 40.

Basically, when the damper 19 expands, the working oil in the contracting upper chamber 26 is caused to flow into the lower chamber 27 by opening the expansion side damping valve 51 in the piston portion 5.

However, the resistance applied by the rectification mechanism 40 having a check valve structure is smaller than the resistance applied when the expansion side damping valve 51 is opened, and therefore a part of the working oil in the upper chamber 26 flows out into the reservoir 25 through the rectification mechanism 40 and the through hole 4a.

At this time, the needle valve body 8 is disposed in the upper end open end of the through hole 4a. Therefore, the needle valve body 8 applies resistance to the flow of working oil flowing into the reservoir 25 through the through hole 4a.

Hence, the expansion side damping force is generated on the basis of the flow passage area of the annular flow passage formed between the pointed end 8a of the needle valve body 8 and the opening opposing the pointed end 8a.

It should be noted that when the piston portion 5 rises, a working oil deficiency corresponding to the expansion of the lower chamber 27 occurs, but the working oil deficiency is made up by working oil flowing in from the reservoir 25 through the contraction side check valve 61 in the base valve portion 6.

Hence, in the front fork 101 according to this invention, the expansion side damping valve 51 in the piston portion 5 constitutes the expansion side damping mechanism and the throttle flow passage 61a in the base valve portion 6 constitutes the contraction side damping mechanism.

In the front fork 101, the flow rate control mechanism 22 applies resistance to the flow of working oil passing through the through hole 4a in the rod body 4, which serves as a bypass passage. Therefore, if the expansion side damping valve 51 and the throttle flow passage 61a serve as main damping mechanisms, the flow rate control mechanism 22 serves as a damping force adjustment mechanism that adjusts the magnitude of the damping force generated by the main damping mechanisms.

Hence, in the front fork 101, the magnitude of the damping force generated by the damper 19 can be varied. As a result, a further improvement in the riding comfort of the motorcycle can be achieved.

It should be noted that in the damper 19, the magnitude of the damping force generated by the piston portion 5 and the base valve portion 6 is adjusted by the flow rate control mechanism 22, but instead, the damping mechanisms of the piston portion 5 and the base valve portion 6 may be omitted and a damping force having an adjustable magnitude may be generated by the flow rate control mechanism 22 itself.

Further, a driving force generated by the actuator 7 of the front fork 101 may be adjusted by the rider in a riding attitude, i.e. while seated on a seat, by operating an operating mechanism disposed on the handle of the motorcycle, for example.

The operating mechanism may be configured as desired rather than being operable by the rider. For example, the operating mechanism may be configured to operate in conjunction with a brake mechanism or activated upon detection of vibration input into the front wheel or the expansion/contraction condition of the front fork.

Next, referring to FIGS. 2 to 5, the configuration of the front fork 102 will be described.

The front fork 102 differs from the front fork 101 in that it includes the suspension spring 35 alone and does not include the damper 19. Therefore, the front fork 102 generates only a spring force using the suspension spring 35.

Further, in this invention, an initial load of the suspension spring 35 provided in the front fork 102 can be adjusted. In so doing, a handle side vehicle height of the motorcycle can be adjusted.

As shown in FIGS. 2 and 5, in the front fork 102, a spring force adjustment mechanism 200 is provided in the upper end side portion of the vehicle body side tube 1. The spring force adjustment mechanism 200 includes an adjuster 201 that is screwed to be capable of rising and falling to the axial center portion of the cap member 15 closing the upper end opening of the vehicle body side tube 1.

As shown in FIG. 5, the adjuster 201 is screwed to the cap member 15 via a seal 202. A base end operating portion 201*a* of the adjuster 201 projects upward from the upper end of the cap member 15.

As shown in FIG. 5, the cap member 15 is formed in a substantially closed-end cylindrical shape. The adjuster 201 is screwed to be capable of rising and falling to an inner side of a tubular portion serving as an upper portion of the cap member 15. The lower end coupling portion 15*a* is formed in a bottom portion serving as a lower portion of the cap member 15. The upper end portion, i.e. the base end portion, of the rod body 4 is coupled to the lower end coupling portion 15*a* and fixed thereto by tightening the lock nut 17.

The spring force adjustment mechanism 200 includes a latch piece 203 that is formed in a ring shape and located adjacent to a lower end of the adjuster 201. The latch piece 203 projects in a radial direction from the tubular portion of the cap member 15. The latch piece 203 includes a projecting piece portion 203*a* that projects toward an outer side of the tubular portion to which the adjuster 201 is screwed. An annular seat 204 contacts a lower surface of the projecting piece portion 203*a*.

The annular seat 204 latches the upper end of the spring holder 10 to the projecting piece portion 203*a* of the latch piece 203. For this purpose, the annular seat 204 is formed to have a larger diameter than the tubular portion of the cap member 15 to which the adjuster 201 is screwed, and formed with an L-shaped cross-section. The annular seat 204 is positioned on the upper end of the spring holder 10 so as to restrict radial direction movement of the spring holder 10.

The annular seat 204 is seated to the upper end of the spring holder 10, and an upper surface thereof is contacted by the projecting piece portion 203*a* of the latch piece 203. As a result, force acting from the projecting piece portion 203*a* of the latch piece 203 can be transmitted in a circumferential direction of the spring holder 10. Further, by providing the annular seat 204, contact between respective end surfaces of the latch piece 203 and the upper end of the spring holder 10 is avoided.

In the front fork 102 including the spring force adjustment mechanism 200 formed as described above, the spring holder 10 can be caused to rise and fall by having the rider pinch and rotate the base end operating portion 201*a* of the adjuster 201. In so doing, an upper end position of the suspension spring 35 can be adjusted, whereby the magnitude of the initial load of the suspension spring 35 can be adjusted. As a result, the handle side vehicle height of the motorcycle can be adjusted.

In the spring force adjustment mechanism 200, the adjuster 201 may be rotated by a remote operation, but in terms of suppressing the cost of the front fork, it is preferable to have the rider perform an operation to adjust the spring force manually in the front fork 102.

The damper 19 need not be built into the front fork 102. Therefore, apart from a lubricant used to lubricate the sliding motion during expansion and contraction, there is no need to house working oil for realizing a damping effect in the front fork 102. As a result, the front fork 102 can be reduced in weight.

In the front fork 100 according to this invention, as described above, the magnitude of the damping force generated by the damper 19 built into the front fork 101 can be adjusted by the actuator 7 disposed in the upper end portion of the vehicle body side tube 1 serving as the upper end portion of the front fork 101. Further, the spring force generated by the internal suspension spring 35 of the other front fork 102 can be adjusted by rotating the adjuster 201 disposed in the upper end portion of the vehicle body side tube 1 serving as the upper end portion of the front fork 102.

As described above, in the front fork 101, the needle valve body 8 is disposed to face the upper end opening in the flow passage constituted by the through hole 4*a* of the rod body 4. The needle valve body 8 thus applies resistance to the flow of working oil that spews out from the upper end opening in the flow passage so as to flow toward the reservoir 25.

However, as long as the needle valve body 8 is capable of applying resistance to the flow of working oil, the needle valve body 8 may be disposed in a bypass passage provided in the vicinity of the piston portion 5 to allow mutual communication between the upper chamber 26 and the lower chamber 27 in order to apply resistance to a flow of working oil passing through the bypass passage. Likewise in this case, a desired damping force can be obtained by adjusting the magnitude of the resistance.

It should be noted that in this case, a control rod inserted into the through hole 4*a* in the axial center portion of the rod body 4 is required to couple the actuator 7 to the needle valve body 8.

By disposing the actuator 7 in the upper end portion of the vehicle body side tube 1 constituting the fork main body 20, this invention may be implemented in a conventional front fork in which a bypass passage is provided in the vicinity of a piston portion and a damper that includes a control mechanism to be capable of adjusting a damping force is provided in the bypass passage, as described above.

Further, the damper 19 built into the front fork 101 is configured such that when the piston portion 5 includes the expansion side damping mechanism, the base valve portion 6 includes the contraction side damping mechanism, and when the piston portion 5 does not include the expansion side damping mechanism, the base valve portion 6 does not include the contraction side damping mechanism. Instead of this configuration, however, the piston portion 5 and the base valve portion 6 may be provided with damping mechanisms as appropriate.

Moreover, in the damper 19 built into the front fork 101, the needle valve body 8 adjusts the magnitude of the driving force by advancing and retreating so as to enlarge and reduce a control flow passage when the actuator 7 is driven. At this time, the size of the control flow passage may be adjusted in two steps, namely between large and small, in three steps, namely between large, medium, and small, or in another plurality of steps, rather than being adjusted continuously.

According to the embodiment described above, the following effects are obtained.

In this invention, the flow rate control mechanism 22 in the damper 19 built into the fork main body 20 of the front fork 101 is controlled by driving the actuator 7 provided in the upper end portion of the vehicle body side tube 1 constituting the fork main body 20. Therefore, the expansion side and contraction side damping force can be adjusted to a desired magnitude using the single actuator 7. As a result, the riding comfort of the motorcycle can be improved while reducing the front wheel side weight and the cost of the motorcycle.

In the flow rate control mechanism 22 at this time, the needle valve body 8 is disposed to face the upper end opening in the through hole 4a of the rod body 4. By employing a configuration in which resistance is applied to the flow of working oil flowing toward the reservoir 25 from the upper end opening of the rod body 4, structural simplicity can be achieved in comparison with a case where the flow rate control mechanism 22 is provided in a bypass passage that bypasses the piston portion 5 housed in the cylinder body 3.

Further, the actuator 7 coupled to the needle valve body 8 is provided in the upper end portion of the vehicle body side tube 1, and therefore driving of the actuator 7 can be secured more easily than in a case where the actuator 7 is disposed in or in the vicinity of the piston portion 5 housed in the cylinder body 3.

Furthermore, in this invention, spring force can be generated in the front fork 102 by the internal suspension spring 35. Hence, the damper 19 need not be built into the front fork 102, and therefore, apart from the lubricant used to lubricate the sliding motion during expansion and contraction, there is no need to house working oil for realizing a damping effect in the front fork 102. As a result, reductions in the weight and cost of the front fork 100 fitted to the motorcycle can be achieved.

Although the invention has been described above with reference to certain embodiments, the invention is not limited to the embodiments described above. Modifications and variations of the embodiments described above will occur to those skilled in the art, within the scope of the claims.

The contents of Tokugan 2010-210414, with a filing date of Sep. 21, 2010 in Japan, are hereby incorporated by reference.

The embodiments of this invention in which an exclusive property or privilege is claimed are defined as follows:

The embodiments of this invention in which an exclusive property or privilege is claimed are defined as follows:

1. A front fork including a fork main body constituted by a vehicle body side tube and a vehicle wheel side tube, comprising:
    a damper that is built into the fork main body and generates a damping force when the fork main body expands and contracts;
    a cylinder body that stands upright in the vehicle wheel side tube and houses the damper;
    a reservoir formed on an exterior of the cylinder body to store a working fluid used by the damper;
    a rod body that stands upright in the vehicle body side tube and is inserted into the cylinder body to be capable of advancing and retreating;
    a piston portion that is held on a tip end portion of the rod body and housed slidably in the cylinder body so as to define an upper chamber and a lower chamber within the cylinder body;
    a through hole formed in an interior of the rod body to allow the working fluid to flow from the cylinder body into the reservoir through the through hole when the rod body expands and contracts relative to the cylinder body;
    a flow rate control mechanism that is disposed in an upper end portion of the vehicle body side tube to face an upper end opening of the through hole, and applies a resistance to a flow of the working fluid flowing toward the reservoir from the upper end opening in the rod body; and
    a driving mechanism that drives the flow rate control mechanism to adjust an expansion side damping force and a contraction side damping force generated by the damper.

2. The front fork as defined in claim 1, further comprising a rectification mechanism provided in the rod body and constituted by a check valve structure, which allows the working fluid in the upper chamber to flow into the through hole but prevents the working fluid in the through hole from flowing out into the upper chamber.

3. The front fork as defined in claim 1, further comprising an expansion side check valve that is provided in the piston portion and allows the working fluid in the lower chamber to flow into the upper chamber but prevents the working fluid in the upper chamber from flowing out into the lower chamber.

4. The front fork as defined in claim 1, further comprising:
    a base valve portion that connects the reservoir to the cylinder body; and
    a contraction side check valve that is provided in the base valve portion and allows the working fluid to flow into the lower chamber from the reservoir but prevents the working fluid in the lower chamber from flowing out into the reservoir.

5. The front fork as defined in claim 1, further comprising:
    a cap member that closes an upper end opening of the vehicle body side tube; and
    a holder member coupled to the cap member and coupled to the upper end portion of the rod body,
    wherein the flow rate control mechanism comprises a flow rate control valve body that is housed to be capable of rising and falling in an axial center portion of the holder member and has a pointed end that faces the upper end opening of the through hole in the rod body so as to form an annular flow passage.

6. The front fork as defined in claim 5, wherein the driving mechanism comprises:
    an electric motor driven by power input from the outside; and
    a plunger that advances and retreats when the electric motor is driven so as to cause the flow rate control valve body to advance and retreat, thereby enlarging and reducing the annular flow passage.

7. The front fork as defined in claim 5, wherein the driving mechanism is housed in a space formed by an inner side of the cap member and an inner side of the holder member.

* * * * *